UNITED STATES PATENT OFFICE.

FOORD VON BICHOWSKY AND JOHN F. HARTHAN, OF POMONA, CALIFORNIA.

PROCESS OF SYNTHESIZING TITANIUM-NITROGEN COMPOUNDS.

1,391,147. Specification of Letters Patent. Patented Sept. 20, 1921.

No Drawing. Application filed June 1, 1920. Serial No. 385,561.

*To all whom it may concern:*

Be it known that we, FOORD VON BICHOWSKY and JOHN F. HARTHAN, both citizens of the United States, residing at Pomona, in the county of Los Angeles and State of California, have invented a new and useful Process of Synthesizing Titanium-Nitrogen Compounds, of which the following is a specification.

This invention relates to the synthetic production of titanium-nitrogen compounds (under which term we include the nitrid, $Ti_2N_2$, and the, so-called, cyanonitrid, $Ti(CN)_2.3Ti_3N_2$) by the reaction with a suitable titanium compound of nitrogen gas or a mixture of nitrogen and hydrogen or ammonia gas.

It is known that nitrogen gas, either alone or in a mixture of various gases, will combine with suitable compounds of titanium at a lower temperature and more rapidly, when the combining is effected in the presence of certain catalytically reactive agents, than if the catalyzer is not present.

The catalytic reactive mass employed by us in the process is composed of a mixture containing an alkaline substance, a suitable titanium compound, and a metal of the iron group such, for example, as iron, nickel, or cobalt. The metal is employed to accelerate and lower the temperature of the reaction. The reactive mass also contains a reducing agent in the form of carbon. We at present consider that the best form of catalytic reactive mass comprises a mixture of sodium carbonate, titanium dioxid, carbon, and iron, the iron preferably being in the finely divided metallic condition.

The components of the catalytic reactive mass may be combined, for example, in proportions by weight as follows:

| | |
|---|---|
| Titanium dioxid | 40 parts |
| Sodium carbonate | 10 parts |
| Lampblack | 10 parts |
| Iron filings | 40 parts |

The mixture of these components is prepared by thoroughly grinding and mixing them with a small amount of water. The said mixture is then pressed into small briquets which are then dried in an atmosphere of natural or artificial gas free from oxygen. Oxygen not being present, burning of the carbon and oxidizing of the iron is prevented.

The combined catalyzer and reactive agent in briquet form is then placed in upright or inclined retorts and heated to a temperature of 1000° C., more or less. While the reactive mass is thus heating a slow current of nitrogen gas is passed therethrough, the nitrogen gas being under a slight pressure, for example, twelve inches of water. When the mass reaches a temperature of approximately 900° C., the absorption of the nitrogen begins and the practical maximum of absorption of the nitrogen takes place at about 1090° C., or at a temperature just below that at which the iron, which has become saturated with carbon, melts. Were the temperature of the catalytic mass increased sufficiently to melt the iron, the iron would clog up the interstices in the mass and thus stop the flow of nitrogen gas.

As exemplifying the catalytic effect of the iron in the reaction, it may be mentioned that titanium dioxid and carbon without the other components of the reactive mass react but slowly at temperatures ranging from about 1400° C. to 1500° C. If sodium carbonate be added to the titanium dioxid and carbon, the reaction proceeds more smoothly at a temperature of about 1200° C. With the addition of iron, however, to the other components, the temperature may be reduced by at least 200° C., thus making it possible to carry out the reaction in tubes made of wrought iron, mild steel or special alloys.

The heating of the catalytic mass is continued until the nitrogen gas ceases to be readily absorbed. The tube in which the reaction takes place, having the space unoccupied by the reactive mass filled with nitrogen gas, is then allowed to cool, the reaction mass is removed and broken up and the excess of iron is removed from the mass in any suitable manner as, for example, by magnetic attraction. After the excess iron is removed, the remaining mass is washed with dilute acid. The resulting residue is then washed and dried and is treated with soda lime in a furnace to remove the nitrogen in the form of ammonia, this operation being similar to the well known procedure of Verrantrap and Will for the estimation of nitrogen as ammonia; or the nitrogen may be caused to combine with superheated steam at a dull red heat, or at a temperature of about 700° C., which results in the obtaining of ammonia and hydrocyanic acid mixed with hydrogen. The ammonia and hydrocyanic acids may then be freed from the hydrogen by appropriate reagents.

We claim:

1. The process for synthesizing titanium-nitrogen compounds, which consists in heating an oxygen-containing titanium compound, carbon, an alkali metal salt and a metal of the iron group in the presence of nitrogen to form a nitrid.

2. The process for synthesizing titanium-nitrogen compounds, which consists in heating to a temperature of not over 1,100° C. a mixture containing an oxygen-containing titanium compound, carbon, an alkali metal salt and a metal of the iron group in the presence of nitrogen gas to form a nitrid.

3. The process for synthesizing titanium-nitrogen compounds, which consists in heating to a temperature of not over 1,100° C. a mixture containing titanium dioxid, sodium carbonate, carbon and particles of a metal of the iron group in the presence of nitrogen gas to form a nitrid.

4. The process for synthesizing titanium-nitrogen compounds, which consists in heating an oxygen-containing titanium compound, carbon, an alkali metal salt and a metal of the iron group in the presence of nitrogen under approximately atmospheric pressure at a temperature of about 1000° C. whereby impure mixtures of titanium nitrid and titanium cyanonitrid are formed.

Signed at Los Angeles, California, this 24 day of May 1920.

FOORD VON BICHOWSKY.
JOHN F. HARTHAN.

Witnesses:
GEORGE H. HILES,
L. BELLE WEAVER.